May 5, 1936.  W. H. BAKER  2,039,513

TRACTION WHEEL UNIT

Filed Jan. 7, 1935  2 Sheets-Sheet 1

WITNESS:
Henry J Baker

INVENTOR
Wm Henry Baker

May 5, 1936.  W. H. BAKER  2,039,513
TRACTION WHEEL UNIT
Filed Jan. 7, 1935  2 Sheets-Sheet 2

WITNESS:
Henry J Baker

INVENTOR
Wm Henry Baker

Patented May 5, 1936

2,039,513

UNITED STATES PATENT OFFICE 2,039,513

TRACTION WHEEL UNIT

William Henry Baker, Des Moines, Iowa

Application January 7, 1935, Serial No. 622

7 Claims. (Cl. 180—65)

This invention relates to improvements in traction wheel units for either road or rail service and more particularly to improvements in the construction and arrangement of the driving mechanism and type of oil-tight enclosures for the actively rotating parts of said units and the mounting of the wheel on the enclosure.

An object of this invention is to provide an improved type, oil-tight, gear housing or enclosure that prevents all oil leakage for the driving gears or mechanism actively connecting an electric motor to a traction wheel.

Another further object is to provide for an electric traction motor wheel unit mechanism, an oil-tight housing or enclosure that prevents all oil leakage and permits the wheel to be carried by the rotating axle.

Still another object is to provide an oil-tight enclosure that permits the wheel load to be carried by the enclosure and the wheel to be rotatably mounted on the exterior portion of said enclosure and driven by a rotating axle.

A further object is to provide a compartment arranged to contain enough lubricant to sustain lubrication to the active working parts for long periods of time.

A further object is to provide an enclosure equipped with a gauge or fluid level gauge plug for the observance of the quantity of lubricant within the enclosure.

A further object is to provide an enclosure wherein an internal gear drive is so mounted and arranged that it may run in a bath of oil without oil leakage.

A further object is to provide an oil-tight enclosure to connect a prime mover directly to a traction wheel for use with any type or kind of gears or mechanism used.

A further object is to provide a type of enclosure wherein various gear ratios may be used.

A further object is to provide a type of enclosure that is rugged and rigid to prevent misalignment or distortion of the component parts.

A further object is to provide a form of enclosure that is easily and quickly disassembled for repairing or servicing the working parts.

A further object is to provide for the confinement of the lubricating fluid an enclosure that permits the use of resilient packings that are of the smallest periphery possible where they frictionally engage rotating or stationary members.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings in which:

The greatest deficiency of all applications of electric motors attached direct to traction wheels, heretofore tried or used, has been the inability to keep the lubricant confined to the frictional generating parts on account of leakage. With my enclosure and arrangement this has been overcome entirely, and even with the use of light oils there is perfect assurance that the lubricant will stay where it is needed.

The use of the lighter consistency lubricating fluids greatly reduces lubricant resistance of rotating parts at high speed, thereby greatly increasing the efficiency of the unit as a whole. My arrangement permits surfaces of minimum periphery to frictionally engage the resilient packings, thus assuring long and lasting use without leakage. This arrangement also permits an internal gear or any type of drive to run in a bath of oil without leakage. This has never been accomplished before when applied to traction wheel units for either rail service or road use.

My enclosure also permits the wheel and bearings to be mounted on the outer surface of the oil-tight enclosure. The axle may then be supported at both ends by a bearing or the outer axle bearing may be dispensed with. The wheel is driven from the axle by means of a suitable connection.

Each wheel unit may be attached to the vehicle chassis by conventional springs or independently sprung, in which case at least eight units could be used; two units tandem at the front on each side and two tandem at the rear on each side. This would provide greater traction and various other factors of safety. Every truck under a train or rail car may be equipped with traction wheel units independently sprung.

Figure 1:
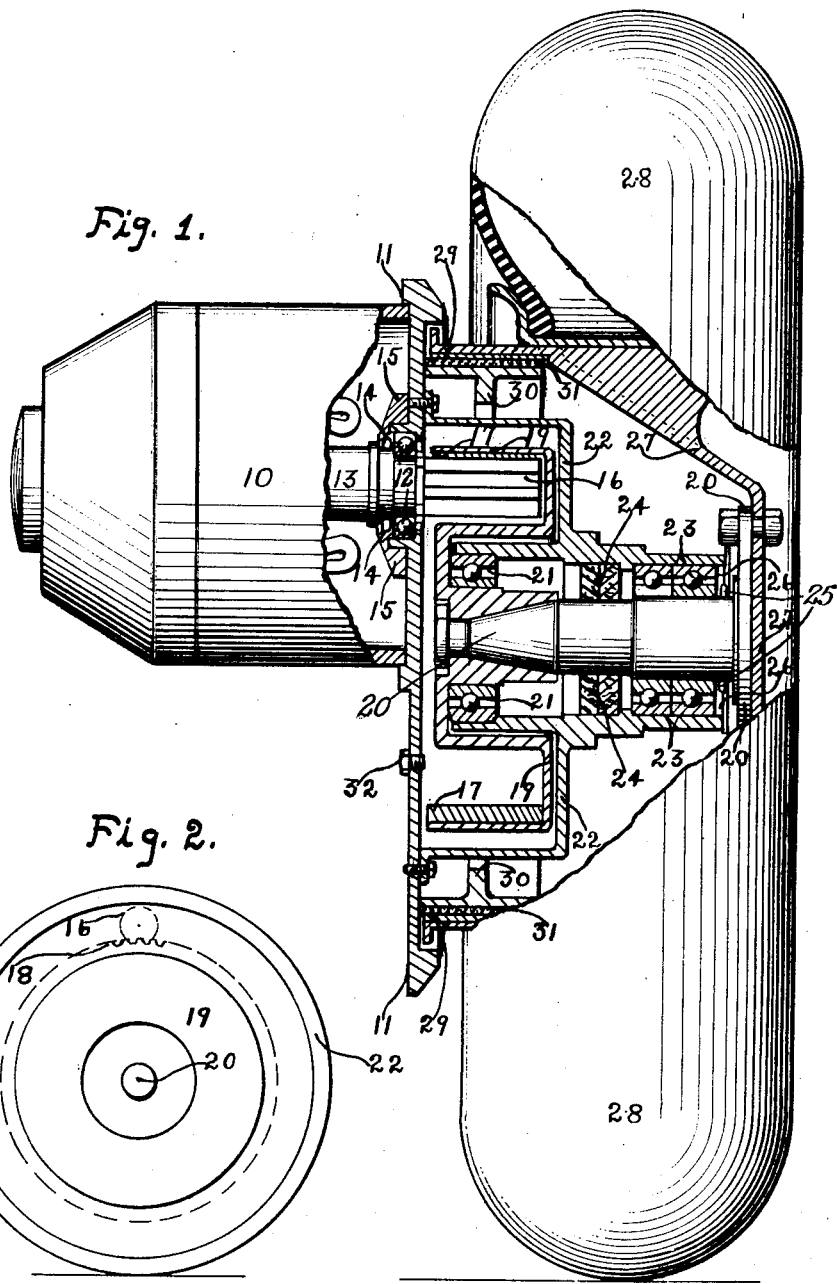
Fig. 1 is a partial sectional elevation of a traction wheel unit.

In Fig. 1 the numeral 10 designates an electric motor attached to an enclosing plate 11 by the use of bolts or clamps. Mounted in plate 11 is a ball or roller bearing 12 placed so that it is concentric with motor 10 and supporting one end of armature shaft 13. A resilient packing 14, which frictionally engages shaft 13, is held in place by a retainer 15 which in turn is secured to enclosing plate 11. The oil-tight enclosing plate 11 and packing 14 tightly enclose one side of the various rotating parts. The numeral 16 designates a pinion either cut integral with armature shaft 13 or attached to the portion of said shaft which projects through enclosing plate 11 and actively engages internal gear 17 or spur gear 18

Figure 2:
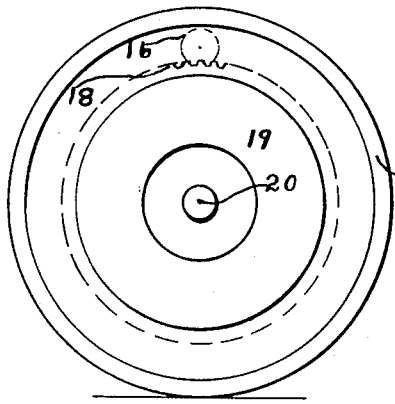
Fig. 2 is a sectional view showing a spur gear arrangement in lieu of internal gear assembly for said traction wheel unit.

(see Fig. 2) when used in lieu of the internal gear 17. Gears 17 or 18 are either rings secured to a driven member 19 or their teeth may be cut integral with the member 19. Driven member 19 is secured to the rotating axle 20. Said axle is held in concentric alignment by the ball or roller bearing 21 which in turn is held in the oil-tight enclosing axle bearing support member 22 which is bolted securely to plate 11.

In the outer end of axle bearing support member 22, bearing 23 is mounted concentrically with bearing support member 22 and axle 20, thus affording a support for the outer end of axle 20. On the inside of support member 22 the resilient packings 24 are secured to frictionally engage axle 20. Numeral 25 designates a resilient packing to further prevent oil seepage and frictionally engages axle 20 and is held in place by bearing adjustment nut 26. Nut 26 permits adjustment of bearing 23 to remove any looseness caused by wear.

Figure 3:
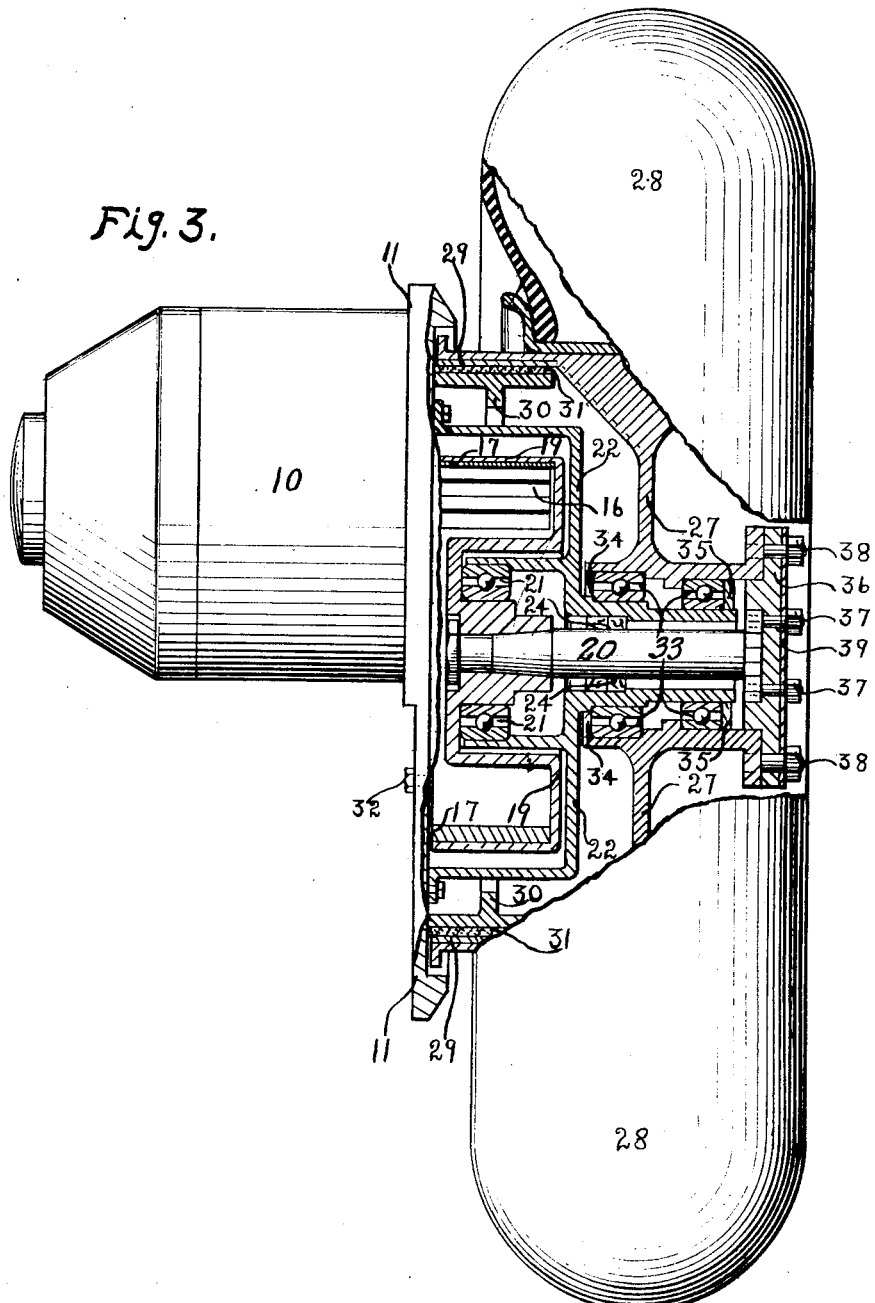
Fig. 3 is a partial sectional view showing a traction wheel mounted on the exterior portion of the enclosure.

Wheel 27 is secured to axle 20. Said wheel carries tire 28, and brake drum 29 is made integral or attached to wheel 27. Brake shoe 30 frictionally engages brake drum 29 through frictional lining 31. When wheel 27 is mounted on the exterior of the oil-tight axle bearing support member 22 as shown in Fig. 3, bearings 33 are supported concentrically by member 22 and rotatably engage wheel 27. The resilient packing 34 which is inserted in the hub of wheel 27 frictionally engages support member 22 to further prevent oil seepage and the adjusting nut 35 screws onto member 22 securing wheel 27 and permits adjustment of bearings 33 to remove any looseness caused by wear. Coupler ring 36 is secured to axle 20 by studs and nuts 37 and to wheel 27 by studs and nuts 38. Enclosing plate 39 is also engaged by studs and nuts 37 and 38. The oil-tight enclosing axle bearing support member 22 together with resilient packings 24 and 25, Fig. 1, or 24 and 34, Fig. 3, together with the oil-tight enclosing plate 11 and packing 14 constitute an oil-tight enclosure for the active component parts of the assembly. The gauge plug 32 permits the gauging of the lubricating fluid in the portion of the enclosure that contains a quantity of lubricating fluid.

Some changes may be made in construction and arrangement of the drive and oil-tight enclosure for the traction wheel unit without departing from the real spirit and purpose of my invention, and it is my intention to cover by my claims any modified forms of structure or use of mechanical equivalents which may be reasonably included within their scope.

I claim:

1. In a device of the class described, a motor secured to an oil-tight enclosing plate, an armature shaft supported within and projecting through said enclosing plate with a pinion on the projecting shaft, an internal gear engaging said pinion and secured to a rotating axle shaft, an oil-tight enclosing axle bearing supporting member secured to the enclosing plate concentrically with the rotating axle shaft and a traction wheel mounted on the rotating axle shaft.

2. In a device of the class described, a motor secured to an oil-tight enclosing plate, a means of operatively connecting the motor armature shaft to a rotating axle, an oil-tight enclosing axle bearing support member rigidly mounted to and cooperating with said oil-tight enclosing plate to form an oil-tight enclosure completely surrounding the active means of connection between motor and axle, said rotating axle emerging from said enclosure, and a traction wheel mounted on the outer end of the axle.

3. In a device of the class described, a motor secured to an oil-tight enclosing plate, a means of operatively connecting the motor armature shaft to a rotating axle, an oil-tight enclosing axle bearing support member rigidly mounted to and cooperating with said oil-tight enclosing plate to form an oil-tight enclosure completely surrounding the active means of connection between the motor and axle, said rotating axle emerging from said enclosure, a wheel rotatably mounted on a portion of the outer surface of the oil-tight enclosing axle bearing support member and means for drivingly connecting the end of said axle to the traction wheel.

4. In a device of the class described, a motor secured to an oil-tight enclosing plate, an armature shaft supported within and projecting through said enclosing plate, with a pinion on the projecting shaft, an internal gear engaging said pinion and secured to one end of a rotating axle shaft, an oil-tight enclosing axle bearing support member rigidly attached to said enclosing plate by means of screws, said plate and member completely enclosing the drive gearing between the motor and axle shaft within an oil-tight enclosure and said axle shaft engaging a rotating traction wheel.

5. In a device of the class described, a motor secured to an oil-tight enclosing plate, an armature shaft supported within and projecting through said plate, a resilient packing to frictionally engage the armature shaft and held in place by a retainer secured to said enclosing plate, a means of operatively connecting the motor armature shaft to a rotating axle, an oil-tight enclosing axle bearing support member rigidly mounted to and cooperating with said plate to form an oil-tight enclosure completely surrounding the operative connection between the motor and axle, said axle emerging from said enclosure and engaging a rotating traction wheel.

6. In a device of the class described, a motor secured to an oil-tight enclosing plate, a means of operatively connecting the motor armature shaft to a rotating axle, an oil-tight enclosing axle bearing support member rigidly mounted to and cooperating with said oil-tight enclosing plate to form an oil-tight enclosure completely surrounding the active means of connection between the motor and axle, said rotating axle emerging from said enclosure, a resilient packing placed inside of the axle bearing support member to frictionally engage the axle and a rotating traction wheel connected to said axle.

7. In a device of the class described, a motor secured to an oil-tight enclosing plate, a means of operatively connecting the motor armature shaft to a rotating axle, an oil-tight enclosing axle bearing support member rigidly mounted to and cooperating with said oil-tight enclosing plate to form an oil-tight enclosure completely surrounding the active means of connection between the motor and axle, said rotating axle emerging from said enclosure, a wheel rotatably mounted on a portion of the outer surface of the oil-tight enclosing axle bearing support member, a resilient packing placed inside of the wheel hub to frictionally engage the said support member and means for drivingly connecting said axle and wheel.

WILLIAM HENRY BAKER.